United States Patent [19]

Smith, Jr. et al.

[11] Patent Number: 4,492,864
[45] Date of Patent: Jan. 8, 1985

[54] NEUTRON WELL LOGGING

[75] Inventors: Harry D. Smith, Jr.; Ward E. Schultz, both of Houston, Tex.

[73] Assignee: Texaco Inc., White Plains, N.Y.

[21] Appl. No.: 288,441

[22] Filed: Jul. 31, 1981

[51] Int. Cl.³ .............................................. G01V 5/10
[52] U.S. Cl. ..................................... 250/259; 250/270
[58] Field of Search ................ 250/259, 262, 269, 270

[56] References Cited

U.S. PATENT DOCUMENTS

| | | | |
|---|---|---|---|
| 3,748,474 | 7/1973 | Murphy | 250/259 |
| 3,817,328 | 6/1974 | Neuman | 250/259 |

Primary Examiner—Craig E. Church
Assistant Examiner—Carolyn E. Fields
Attorney, Agent, or Firm—Jack H. Park; Ronald G. Gillespie

[57] ABSTRACT

This invention relates to an improved method for determining the oil saturation of subsurface earth formations in the vicinity of a well borehole. High energy neutrons irradiate the subsurface earth formations and gamma rays caused by inelastic scatter with the subsurface earth formation constituent materials are measured. For a chosen borehole depth, gamma ray logs are taken in different situations: first, with the formation fluid water and oil mixture in an undisturbed state; second, after flushing the formation with alcohol to displace the formation water and oil mixture; and, finally, after flushing the alcohol from the formation with water to obtain a measurement with no oil in the formation. The gamma ray measurements obtained are then used to determine the oil saturation without requiring knowledge of the porosity of the earth formation, borehole conditions or formation type. When the original oil content of the formation is at a naturally flushed, or residual, oil saturation, the present invention may be used to determine the residual oil saturation.

8 Claims, 2 Drawing Figures

NEUTRON WELL LOGGING

BACKGROUND OF THE INVENTION

1. Field of the Invention

This invention relates to a nuclear well logging method of determining oil saturation of subsurface earth formations in the vicinity of a well borehole from gamma ray measurements obtained after irradiating the formations with high energy neutrons.

2. Description of the Prior Art

U.S. Pat. Nos. 3,748,474 and 3,562,523 related to methods for determining the oil saturation of an earth formation. Both methods were based on the measurement of gamma rays emitted as the result of the decay of captured thermal neutrons with different types of fluids being injected for different logs. For the techniques of these patents to work, the fluids to be injected were required to be either saline, because of the high thermal neutron capture cross section of chlorine, or contain added materials having elements with large thermal neutron capture cross sections. Further, the actual thermal neutron capture cross section for both the in situ formation fluid and the injected fluid had to be known.

In U.S. Pat. No. 3,780,302, an earth formation in the vicinity of the well borehole was irradiated in the in situ condition and measurements of the formation calcium, silicon, carbon and oxygen inelastic scatter gamma rays were obtained. With this technique, the inelastic scatter gamma rays from carbon, oxygen, silicon and calcium in the formation were detected and used as an indicator of the formation porosity. The carbon/oxygen ratio obtained could then be used as an indicator of the presence of hydrocarbons and a silicon/calcium ratio obtained could be used as an indicator of the formation lithology. By appropriately combining measurements of the carbon/oxygen ratio and a silicon/calcium ratio with estimates of the formation porosity, the oil saturation of the formation matrix surrounding the borehole could be computed and logged as a function of the borehole depth. However, knowledge of the borehole conditions (i.e. borehole diameter, casing thickness, type of borehole fluid) was required because of the adverse effect of variations in these conditions on the measurements of inelastic scatter gamma rays.

SUMMARY OF THE INVENTION

The present invention is an improved method of pulsed neutron well logging in order to determine the oil saturation in a formation of interest. Since the determination of oil saturation is a condition precedent to a decision to produce an oil well, the accuracy of such a determination is highly desirable. According to the method of the present invention, the oil saturation in a formation of interest can be determined independently of the salinity and shaliness of the formation, and is not affected by changes in formation porosity or type (such as from limestone to sandstone) or changes in the borehole conditions (such as casing weight, borehole size, borehole fluid and the like).

Briefly stated, an earth formation of interest adjacent a well bore is irradiated with high energy neutrons. Gamma rays caused by the inelastically scattered neutrons are measured within the energy bands corresponding to neutrons inelastically scattered from carbon and oxygen, since the relative presence of carbon relative to oxygen is an indicator of the presence of hydrocarbons in the formation of interest. It should also be understood that the relative abundances of carbon and oxygen can also be obtained by spectral unfolding or least squares fitting routines known in the art.

The formation oil and water mixture is then displaced from the formation of interest with a mutually soluble liquid and the formation of interest is subsequently irradiated with high energy neutrons. Gamma rays caused by the inelastically scattered neutrons are again measured within the energy bands corresponding to high energy neutrons inelastically scattered from carbon and oxygen.

Finally, the mutually soluble liquid is displaced from the formation of interest with water and the formation of interest is subsequently irradiated for the third time with high energy neutrons. Gamma rays caused by the inelastically scattered neutrons are again measured within the energy bands corresponding to high energy neutrons inelastically scattered from carbon and oxygen.

The oil saturation of the formation of interest can then be determined by appropriate combination of the three gamma ray measurements of the relative presence of oxygen and carbon.

DESCRIPTION OF THE PREFERRED EMBODIMENT

Figure 1:
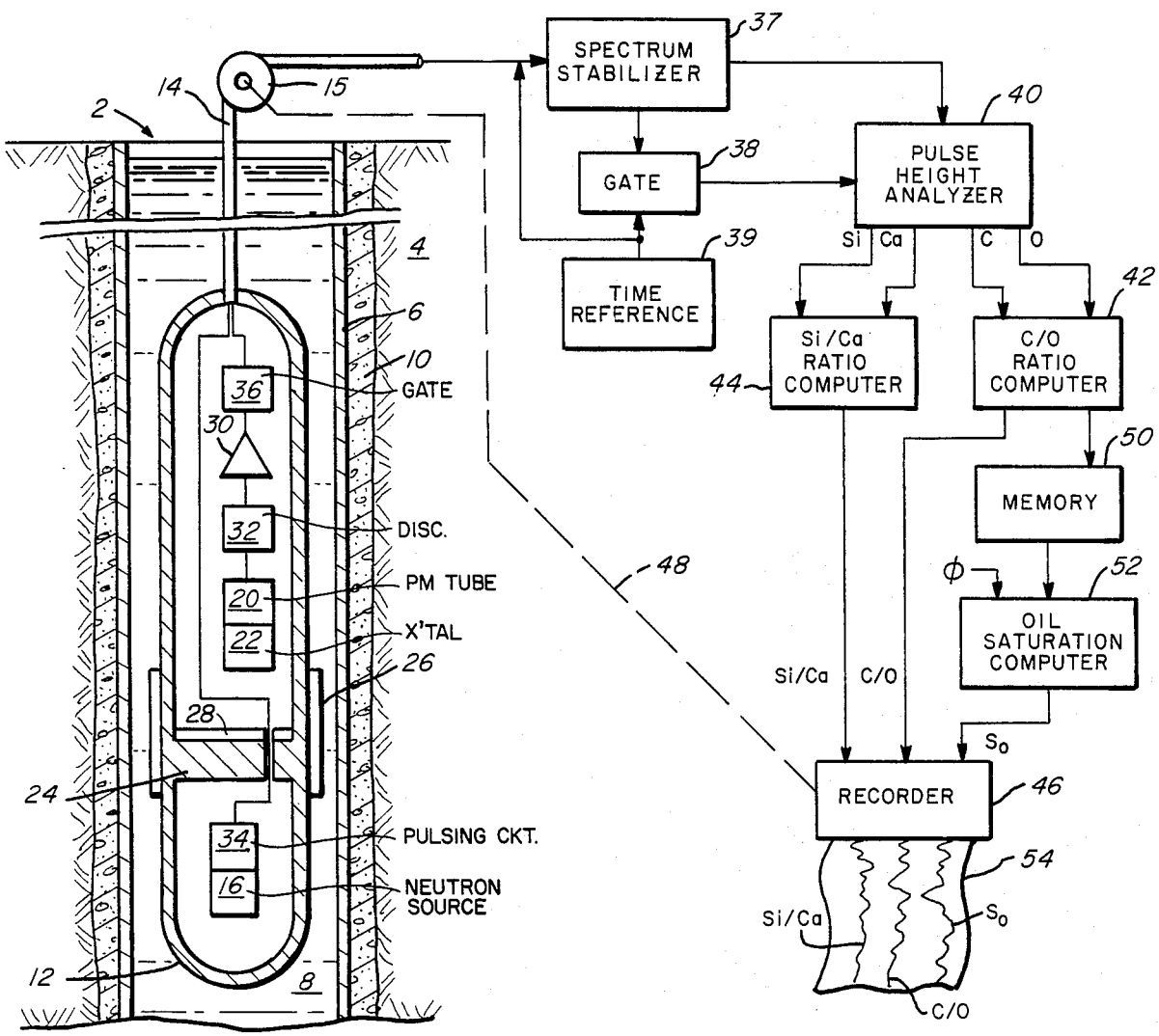
FIG. 1 is an overall schematic block diagram of a well logging system in accordance with the invention.

A simplified functional representation in the form of a block diagram of a well logging apparatus in accordance with the present invention is shown in FIG. 1. A borehole 2 penetrating earth formations 4 is lined with a steel casing 6 and filled with a borehole fluid 8. The steel casing 6 is cemented in place by a cement layer 10 which also serves to prevent fluid communication between adjacent producing formations in the earth 4.

The downhole portion of the logging system may be seen to be basically composed of an elongated, fluid tight hollow body member or sonde 12, which during the logging operation is passed longitudinally through the steel casing 6 and is sized for passage therethrough. Surface instrumentation whose function will be discussed in more detail subsequently is shown for processing and recording electrical measurements provided by the sonde 14. A well logging cable 14 which passes over a sheave wheel 15 supports sonde 12 in the borehole and also provides a communication path for electrical signals to and from the surface equipment and the sonde 12. The cable 14 may be a conventional armored well logging type and may have one or more electrical conductors for transmitting such signals between the sonde 12 and the surface apparatus.

The sonde 12 contains a source of high energy neutrons 16. The neutron source 16 contemplated for use herein is a pulsed neutron source operating from the principle of the deuterium-tritium reaction. However, it will understood by those skilled in the art that the invention is not limited thereto. Any logging technique which can discern the relative abundance or presence of carbon and oxygen can be used.

A suitable radiation detector comprising a photomultiplier tube 20 and a detector crystal 22 is provided in the sonde 12 for detecting gamma rays resulting from the inelastic scatter of high energy neutrons by the earth formations 4 surrounding the well borehole 2. A radiation shield 24 of iron, lead or other suitable material is interposed between the neutron source 16 and the detector crystal 22 of the apparatus. Additionally, a thermal neutron shielding sleeve 26 may be provided as shown about the detector crystal 22 on either the interior or the exterior wall portion of sonde 12. A thermal neutron shielding disk 28 can be interposed between the radiation shield 24 and the detector crystal 22 to reduce the probability of thermal neutrons reaching the detector crystal 22. The detector crystal 22 may comprise thallium doped sodium iodide, cesium iodide or other like activated material which is optically coupled to the photomultiplier tube 20.

The radiation shield 24 reduces the probability of direct irradiation of the detector crystal 22 by neutrons emitted from the pulsed neutron source 16. The thermal neutron shielding disk 28 and the shielding sleeve 26 surrounding the detector crystal 22 may be comprised of boron or any other suitable material having a high thermal neutron capture cross section. This shield serves to further reduce the possibility of thermal neutrons following a tortuous path after having been slowed by the borehole fluid 8 or the radiation shield 24 from reaching the vicinity of the detector crystal 22 and possibly causing neutron activation of the iodine or other elements comprising the crystal. Moreover, the thermal neutron shielding reduces the probability of thermal neutrons from previous activations of the neutron source 16 interacting with materials in the sonde 12 itself or the detector crystal 22 itself and causing the emission of gamma radiation during the time period when the inelastic neutron gamma rays are being observed.

As is well known in the art, the detector crystal 22 produces a discrete flash of light whenever a gamma ray passes therethrough and exchanges energy with its crystal lattices. Photomultiplier tube 20 generates a voltage pulse proportional in height to the intensity of each such scintillation which occurs in the detector crystal 22. The intensity of such scintillations is functionally related to the energy of the gamma ray causing the light flash and thus a voltage pulse generated by the photomultiplier tube 20 has an amplitude functionally related to the energy of the corresponding gamma ray. These proportional voltage pulses produced by photomultiplier tube 20 comprise a detector signal which is supplied to a linear amplifier 30 via a discriminator 32. The discriminator 32 may be used if desired to discriminate for example against low energy background gamma radiation resulting from the thermal activation of the detector crystal 22 by the reaction of iodine $I^{127}$ with a neutron to yield iodine $I^{128}$ plus a gamma ray. A preset bias level may be used to pass only pulses from the photomultiplier tube 20 exceeding the height corresponding to 1.78 MEV gamma rays generated in the inelastic scattering of neutron by silicon. Low energy background gammas contributing to pulse pile up could be eliminated in this manner.

The neutron source 16 is preferably operated by a pulsing circuit 34, which may be of the conventional design as known in the art, and functions to operate the neutron source 16 in short duration pulses. The neutron source 16 is pulsed, for example, in the manner of U.S. Pat. No. 3,780,302 which is incorporated herein for all purposes.

Output signals from the photomultiplier tube 20 are conducted via the discriminator 32 and linear amplifier 30 to a cable driver circuit 36 of conventional design. The output signals from the cable driver circuit 36 comprise a sequence of count pulses resulting from gamma rays detected by the downhole detector crystal 22. The pulses of interest for the purposes of the present invention result from gamma rays resulting from the excitation of nuclei in the vicinity of the detector crystal 22 which have been excited by the inelastic scattering of neutrons emitted by the neutron source 16.

Accordingly, at the surface, pulses from cable 14 are received through a spectrum stabilizer 37 and a gating circuit 38. The gating circuit 38 responds to a time reference circuit 39 and controls the time that pulses from cable 14 may be supplied to a pulse height analyzer 40. The time reference circuit 39 also activates the pulsing circuit 34 in the manner of U.S. Pat. No. 3,780,302. The spectrum stabilizer 37 functions in the conventional manner for gain control purposes. With the present invention, the time interval that the gate 38 is permitted to pass pulses from inelastic interactions should be only during the neutron burst from source 16 and as short and as near to the start of this burst as feasible, in order to minimize thermal neutron capture gamma radiation pulses reaching pulse height analyzer 40, while giving maximum possible inelastic scatter gamma radiation counts.

The pulse height analyzer 40 may be of conventional design as known in the art and having, for example, four or more channels or energy divisions corresponding to quantizations of the pulse height of the input pulses, if desired. The pulse height analyzer 40 functions to sort and accumulate a running total of the incoming pulses into a plurality of storage locations or channels based on the height of the incoming pulses which, it will be recalled, is directly related to the energy of the inelastic scatter gamma rays causing the pulse. The output of the pulse height analyzer 40 in the case of the present invention is in the form of total count pulses occurring in energy ranges or windows corresponding to neutrons inelastically scattered from carbon or oxygen occurring in each of the energy windows during the time interval that the downhole detector signals are supplied through gate 38 to the pulse height analyzer 40 and are outputted as separate digital signals. It will be understood, of course, that the individual time interval pulse counts may be integrated over a period for better statistical accuracy as known in the art. The carbon and oxygen count rates are supplied to a carbon/oxygen ratio computer 42. If desired, the silicon and calcium count rates are supplied to a silicon/calcium ratio computer 44. The ratio computers 42 and 44 may be of conventional design as known in the art. The output signal from the ratio computers 42 and 44 can be recorded as a function of borehole depth by a recorder 46 which is mechanically or electronically linked to the sheave wheel 15 as indicated by the dotted line 48.

A memory or storage buffer 50 is connected to the C/O ratio computer 42 to receive and store a succession, whether two, three or more, of C/O ratio readings obtained, in a manner to be set forth below, for a particular formation/borehole depth of interest. The C/O ratios stored for a particular formation/borehole depth in memory 50 are furnished to an oil saturation computer 52, which computes oil saturation, $S_o$, in a manner to be set forth, at the location in the borehole of interest. The computed value $S_o$ is also provided to the recorder 46 for display. A log 54 of quantities of interest as a function of borehole depth is schematically illustrated as an output of recorder 46.

Figure 2:
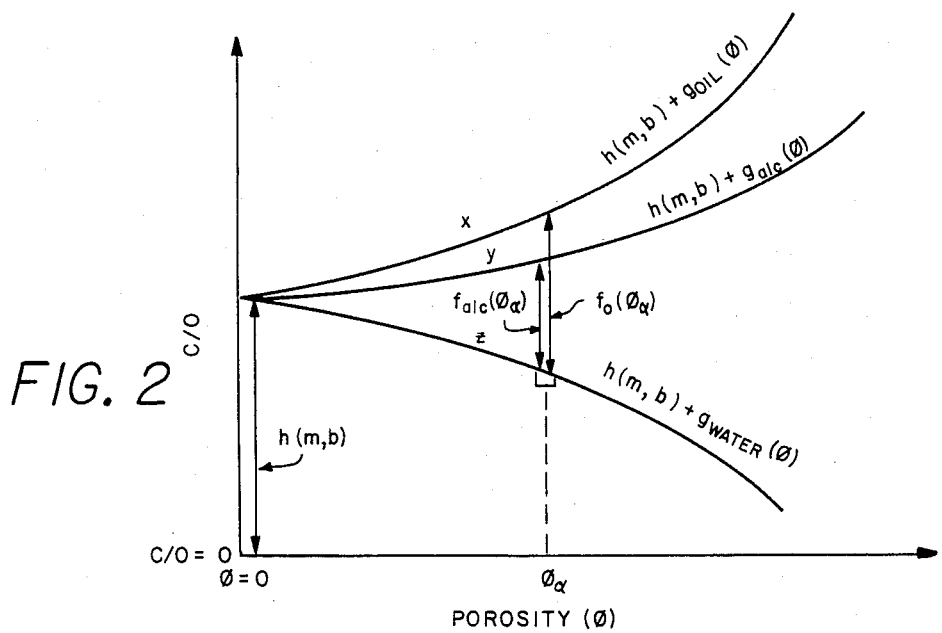
FIG. 2 is a graphical representation showing the carbon/oxygen (C/O) ratio as a function of the formation porosity for the three conditions of the formation of interest: (x) totally oil saturated; (y) with the formation oil and water mixture fully displaced by a mutually soluble liquid, such as an alcohol; and (z) totally water saturated.

FIG. 2 depicts, for a given formation type, carbon-/oxygen (C/O) ratio curves x, y and z as a function of a particular formation having porosity ($\phi$) with oil, a mutually soluble liquid such as alcohol or a micellular solution, and water, respectively, in the porous portions of the formation. As used in the present invention, a micellular solution is defined as a solution in which the formation oil and water mixture would be miscible. The magnitude of all of these C/O curves for $\phi$ at 0% is a function (h) of the particular formation matrix type (m) and the borehole conditions (b) of the formation of interest, and is given by:

C/O ($\phi=0$) = h (m, b) curves x, y and z can therefore be expressed as:

x $C/O_{oil}(\phi) = h(m,b) + g_{oil}(\phi)$ y $C/O_{alcohol}(\phi) = h(m,b) + g_{alcohol}(\phi)$ z $C/O_{water}(\phi) = h(m,b) + g_{water}(\phi)$ The separation between curves x and z, as a function of porosity ($\phi$), is therefore given by:

$f_o(\phi) = g_{oil}(\phi) - g_{water}(\phi)$ and similarly for curves y and z:

$f_{alc}(\phi) = g_{alcohol}(\phi) - g_{water}(\phi)$

Since the C/O ratio for alcohol is intermediate that of oil and water, the measured separation between an alcohol and a water saturated formation, $f_{alc}(\phi)$, is approximately proportional to the separation between an oil and a water saturated formation, $f_o(\phi)$, so that:

$$f_{alc}(\phi) = K f_o(\phi) \qquad (1)$$

where K is a constant $\lesssim 1$ determined from test measurements, which is independent of $\phi$, and $f_o(\phi)$ is a function defined from test pit formation measurements.

The C/O value in a given formation having an oil saturation $S_o$, and a water saturation $(1 - S_o)$, can be expressed as:

$$C/O \approx h(m,b) + g_{water}(\phi) + S_o \cdot f_o(\phi) \qquad (2)$$

Having established these background relationships for a specific zone ($\alpha$), with a porosity $\phi_\alpha$, the oil saturation $S_o$ may be determined according to the present invention. The C/O ratio of the formation is measured after having irradiated the in situ formation of interest with high energy neutrons. This ratio can be expressed as:

$$C/O_1 = h(m_\alpha, b_\alpha) + g_{water}(\phi_\alpha) + S_o \cdot f_o(\phi_\alpha) \qquad (3)$$

The formation oil and water mixture is displaced from the formation of interest with a mutually soluble liquid, such as an alcohol or a micellular solution, and then irradiating the formation a second time with high energy neutrons to determine C/O. If the radial extent of the injected alcohol or micellular solution is greater than the radius of investigation of the C/O system ($\approx 9''$), the C/O ratio can be expressed as:

$$C/O_2 = h(m_\alpha, b_\alpha) + g_{water}(\phi_\alpha) + f_{alc}(\phi_\alpha) \qquad (4)$$

and using equation (1)

$$C/O_2 = h(m_\alpha, b_\alpha) + g_{water}(\phi_\alpha) + K f_o(\phi_\alpha) \qquad (5)$$

The mutually soluble liquid is then displaced from the formation of interest with water and the formation is again irradiated with high energy neutrons and a C/O ratio is measured for a third time:

$$C/O_3 = h(m_\alpha, b_\alpha) + g_{water}(\phi_\alpha) \qquad (6)$$

Equations (5) and (6) can be combined to produce:

$$C/O_2 - C/O_3 = K f_o(\phi_\alpha) \qquad (7)$$

Also equations (3) and (5) can similarly be combined:

$$C/O_1 - C/O_2 = S_o f_o(\phi_\alpha) \qquad (8)$$

Combining equations (7) and (8) yields:

$$S_o = K \left( \frac{C/O_1 - C/O_3}{C/O_2 - C/O_3} \right) \qquad (9)$$

Hence, by the procedure outlined above, the three C/O values can be obtained which enable the user to determine the oil saturation $S_o$ in the oil saturation computer, independent of porosity, borehole conditions and formation type.

If the porosity of the zone ($\alpha$) is well known, the intermediate C/O log step described above (the measurement with the alcohol) is not necessary. In that case, the known porosity $\phi$ for a particular borehole depth of interest is furnished directly to computer 52, as schematically indicated. Equations (3) and (6) can be utilized in computer 52 to determine $S_o$ in either of the following manners:

$$C/O_1 - C/O_3 = S_o f_o(\phi_\alpha) \qquad (10)$$

$$\text{or } S_o = \frac{1}{f_o(\phi_\alpha)} (C/O_1 - C/O_3) \qquad (11)$$

It is to be noted that equation (11) depends directly on porosity which is in this instance, however, known. Oil saturation can still be determined independently of borehole conditions and formation matrix type.

In the preferred embodiment, the borehole 2 is shown as cased. In situations where a well is logged before the casing 6 is set in place, and where all movable oil in the vicinity of borehole 2 has been displaced by drilling fluid filtrate, the techniques of the present invention set forth above, may also be performed. The measure of oil saturation so obtained represents, in this situation, the residual oil saturation of the formation.

It should be noted that if the original formation waters are saline, and if the water used to flush the alcohol has the same salinity, then the capture gamma radiation calcium/silicon ratio (also obtained with the carbon-/oxygen system) can be used, since the capture calcium energy window responds to chlorine capture gamma radiation to obtain a second measure of oil saturation $S_o$ as a verification of the measure obtained according to the present invention. In this situation, gating in the manner of U.S. Pat. No. 3,946,226 would be performed to obtain subsequent time-dependent radiation measurements for at least one count interval after the end of the neutron burst from source 16.

The method disclosed above may make other alternative embodiments of the invention apparent to those skilled in the art. It is the purpose of the appended claims to encompass all such changes and modifications as fall within the true spirit and scope of the invention.

We claim:

1. A method for determining the oil saturation of an earth formation of interest adjacent a well bore, comprising the steps of:
   (a) irradiating the formation of interest with high energy neutrons;
   (b) obtaining a measure of the relative presence of carbon and oxygen in the formation from inelastic scatter gamma rays returned from the irradiated formation;
   (c) displacing the formation oil and water mixture from the formation of interest with a mutually soluble liquid;
   (d) irradiating the formation a second time with high energy neutrons;
   (e) obtaining a second measure of the relative presence of carbon and oxygen in the formation from inelastic scatter gamma rays returned from the formation containing the mutually soluble liquid;
   (f) displacing the mutually soluble liquid from the formation of interest with water;
   (g) irradiating the earth formation a third time with high energy neutrons;
   (h) obtaining a third measure of the relative presence of carbon and oxygen from inelastic scatter gamma rays of the formation containing water;
   (i) determining from the three gamma ray measurements of carbon and oxygen the oil saturation of the formation of interest.

2. The method of claim 1, wherein said steps of irradiating comprise:
   (a) activating a pulsed neutron source.

3. The method of claim 1, wherein said step of displacing the formation oil and water mixture is with a liquid containing an alcohol.

4. The method of claim 1, wherein said step of displacing the formation oil and water mixture is with a micellular solution.

5. The method of claim 1, further including the step of:
   (a) forming a record of oil saturation as a function of borehole depth.

6. A method for determining the oil saturation of a known porosity earth formation of interest adjacent a well bore, comprising the steps of:
   (a) irradiating the formation of interest with high energy neutrons;
   (b) obtaining a measure of the relative presence of carbon and oxygen in the formation from inelastic scatter gamma rays returned from the irradiated formation;
   (c) displacing the formation oil and water mixture from the formation of interest with a mutually soluble liquid;
   (d) displacing the mutually soluble liquid from the formation of interest with water;
   (e) irradiating the formation again with high energy neutrons;
   (f) obtaining a measure of the relative presence of carbon and oxygen from inelastic scatter gamma rays of the formation containing water; and
   (g) determining from the two gamma ray measurements of carbon and oxygen and the known formation porosity the oil saturation of the formation of interest.

7. The method of claim 6, wherein said steps of irradiating comprise:
   (a) activating a pulsed neutron source.

8. The method of claim 6, further including the step of:
   (a) forming a record of oil saturation as a function of borehole depth.

* * * * *